(12) United States Patent
Cao et al.

(10) Patent No.: US 12,705,262 B2
(45) Date of Patent: Aug. 11, 2026

(54) METHODS, SYSTEMS, AND STORAGE MEDIA FOR OBJECT DEFINITION BASED ON ENTITY-RELATIONSHIP INFORMATION

(71) Applicant: HANGZHOU YILINGERSI INFORMATION TECHNOLOGY CO., LTD., Hangzhou (CN)

(72) Inventors: Cai Cao, Hangzhou (CN); Jian Xu, Hangzhou (CN); Junfeng Lu, Hangzhou (CN); Xiaofan Yu, Hangzhou (CN); Jing Xu, Hangzhou (CN)

(73) Assignee: HANGZHOU YILINGERSI INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/214,082

(22) Filed: May 21, 2025

(65) Prior Publication Data

US 2025/0363137 A1 Nov. 27, 2025

(30) Foreign Application Priority Data

May 21, 2024 (CN) ........................ 202410627575.X

(51) Int. Cl.
*G06F 16/28* (2019.01)

(52) U.S. Cl.
CPC .................................. *G06F 16/288* (2019.01)

(58) Field of Classification Search
None
See application file for complete search history.

(56) References Cited

U.S. PATENT DOCUMENTS 7,461,077 B1 * 12/2008 Greenwood ........ G06F 16/2428 707/999.102
7,739,212 B1 * 6/2010 Reynar ................. G06F 16/328 706/46

(Continued)

FOREIGN PATENT DOCUMENTS

CN 101460991 A 6/2009
CN 106104591 A 11/2016

OTHER PUBLICATIONS

First Office Action in Chinese Application No. 202410627575.X mailed on Jun. 22, 2024, 13 pages.

(Continued)

*Primary Examiner* — Aleksandr Kerzhner
*Assistant Examiner* — Anugeetha Kunjithapatham
(74) *Attorney, Agent, or Firm* — Poseidon Advanced IP LLC

(57) ABSTRACT

The present disclosure provides methods, systems, and storage media for object definition based on entity-relationship (ER) information. The method includes, in response to an object definition instruction input by a user, obtaining the ER information, wherein the ER information represents a relationship between a first object and a second object through a foreign key, and each of the first object and the second object is a data structure corresponding to a data table; performing an attribute definition operation on the first object to construct the first object including information of the second object, wherein the attribute definition operation includes: in response to determining that the foreign key satisfies a first preset condition, processing an attribute type of the first object or adding a new attribute of the first object.

18 Claims, 6 Drawing Sheets

(56) References Cited

U.S. PATENT DOCUMENTS

| | | | | |
|---|---|---|---|---|
| 8,924,269 | B1 * | 12/2014 | Seubert | G06Q 40/00 |
| | | | | 705/35 |
| 11,475,052 | B1 * | 10/2022 | Nielsen | G06F 16/2282 |
| 2007/0038651 | A1 * | 2/2007 | Bernstein | G06F 16/28 |
| 2008/0120129 | A1 | 5/2008 | Seubert et al. | |
| 2009/0094577 | A1 * | 4/2009 | Fachat | G06F 9/4493 |
| | | | | 707/999.002 |
| 2009/0144320 | A1 * | 6/2009 | Weinberg | G06F 16/284 |
| | | | | 707/999.102 |
| 2015/0379085 | A1 * | 12/2015 | Petculescu | G06F 16/2282 |
| | | | | 707/714 |
| 2019/0073388 | A1 | 3/2019 | Desmarets | |
| 2019/0130020 | A1 * | 5/2019 | Helms | G06F 16/288 |
| 2021/0026816 | A1 * | 1/2021 | Martinsson | G06F 16/254 |
| 2021/0209124 | A1 * | 7/2021 | Vijayaraghavan | G06F 16/288 |
| 2023/0236587 | A1 * | 7/2023 | Yang | G05B 19/4184 |
| | | | | 702/185 |
| 2023/0350867 | A1 * | 11/2023 | Noll | G06F 16/288 |
| 2024/0134883 | A1 | 4/2024 | Buchmann | |

OTHER PUBLICATIONS

Notification to Grant Patent Right for Invention in Chinese Application No. 202410627575.X mailed on Jul. 17, 2024, 5 pages.

* cited by examiner

Figure 2:
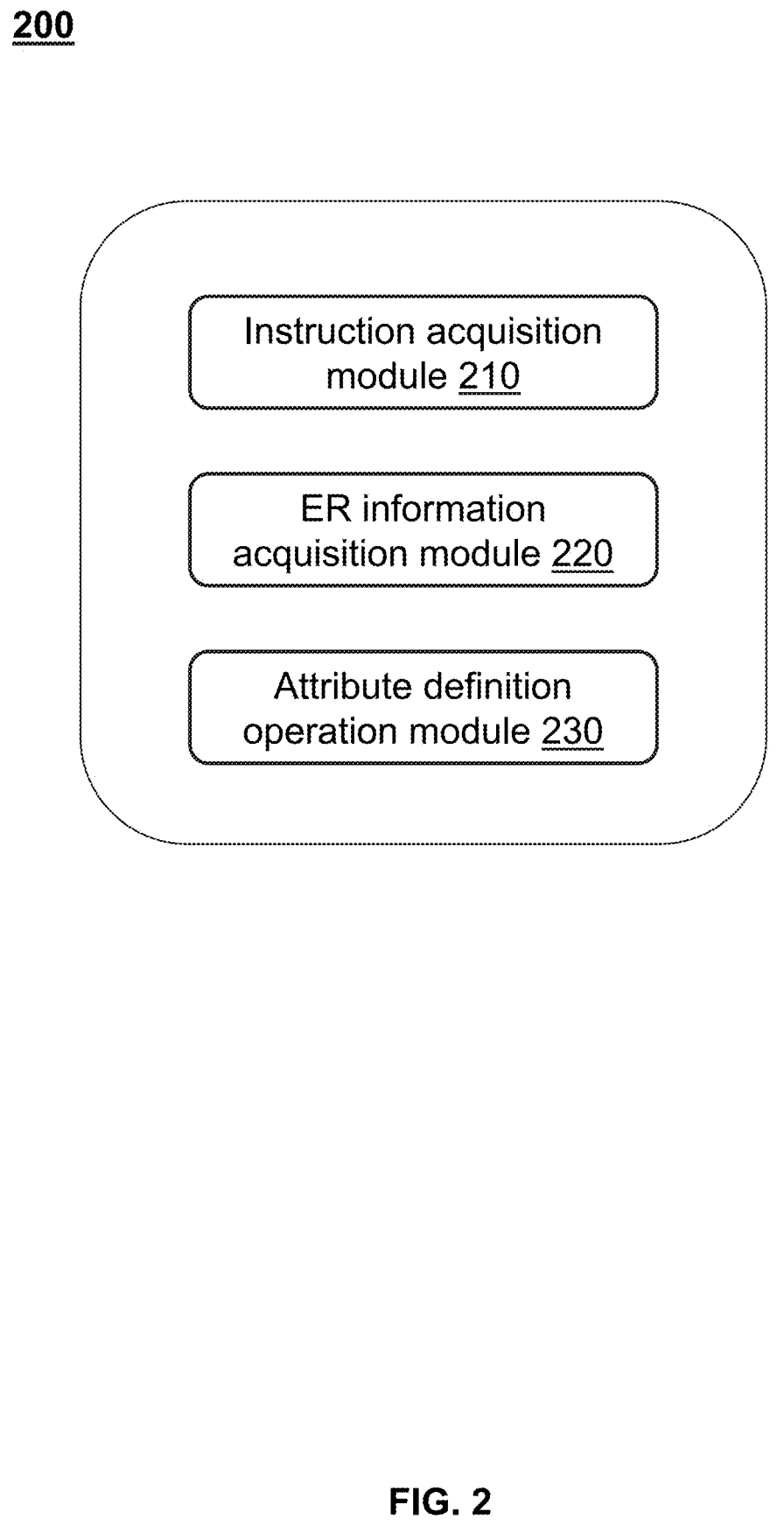

200

Instruction acquisition module 210

ER information acquisition module 220

Attribute definition operation module 230

METHODS, SYSTEMS, AND STORAGE MEDIA FOR OBJECT DEFINITION BASED ON ENTITY-RELATIONSHIP INFORMATION

CROSS-REFERENCE TO RELATED APPLICATIONS

This application claims priority to the Chinese Patent Application 202410627575. X, filed on May 21, 2024, the contents of which are hereby incorporated by reference.

TECHNICAL FIELD

The present disclosure relates to the technical field of databases, and in particular, to methods, systems, and storage media for object definition based on entity-relationship (ER) information.

BACKGROUND

In database development, mapping table information and table association information in a database into objects in a code is a core task. However, the current technical solutions for this mapping process have several limitations. For example, certain approaches (such as MyBatis and Hibernate) require developers to perform tedious manual coding, which increases both development costs and time. Additionally, some tools (such as MyBatis Generator and JHipster) can automatically generate an object code, yet the generated objects often do not meet the practical development requirements.

Therefore, it is desirable to provide a method, system, and storage medium for object definition based on ER information to improve the quality and efficiency of object generation.

SUMMARY

The present disclosure provides a method for object definition based on entity-relationship (ER) information, which may be implemented on a computing device including at least one processor and at least one storage device. The method may include: in response to an object definition instruction input by a user, obtaining the ER information, wherein the ER information may represent a relationship between a first object and a second object through a foreign key, and each of the first object and the second object may be a data structure corresponding to a data table; constructing the first object including information of the second object by performing an attribute definition operation on the first object, wherein the attribute definition operation may include: in response to determining that the foreign key satisfies a first preset condition, processing an attribute type of the first object, or adding a new attribute of the first object, including: in response to determining that the first object includes a first foreign key pointing to the second object, adding an attribute of a type of the second object to the first object, or replacing an attribute type of the first foreign key with the type of the second object; or in response to determining that the second object includes a second foreign key pointing to the first object, adding, to the first object, an attribute of the type of the second object or an attribute of a collection type of the second object; the adding, to the first object, an attribute of a type of the second object or an attribute of a collection type of the second object may include: adding a new attribute to the first object, a type of the new attribute being the same as or associated with the type or the collection type of the second object; and the replacing an attribute type of the first foreign key with the type of the second object may include: replacing an attribute type of a first attribute used as the first foreign key in the data structure of the first object with the type of the second object; and when a count of second objects represented by the foreign key is two or more, the constructing the first object including information of the second object by performing an attribute definition operation on the first object may further include: in response to a selection instruction of the user, determining a second object selected by the selection instruction from the two or more second objects.

The present disclosure provides a system for object definition based on entity-relationship (ER) information, which may include at least one storage device including a set of first instructions, and at least one processor in communication with the at least one storage device. When executing the set of the first instructions, the at least one processor may cause the system to perform operations including: in response to an object definition instruction input by a user, obtaining the ER information. The ER information may represent an association relationship between a first object and a second object through foreign key representation, and the first object and the second object may both be data structures corresponding to data tables. Constructing the first object including information of the second object may be performed by performing an attribute definition operation on the first object. The attribute definition operation may include: in response to determining that the foreign key satisfies a first preset condition, processing an attribute type of the first object, or adding a new attribute of the first object. This may include: in response to determining that the first object includes a first foreign key pointing to the second object, adding an attribute of a type of the second object to the first object, or replacing an attribute type of the first foreign key with the type of the second object; or in response to determining that the second object includes a second foreign key pointing to the first object, adding, to the first object, an attribute of the type of the second object or an attribute of a collection type of the second object. The adding, to the first object, an attribute of a type of the second object or an attribute of a collection type of the second object may include: adding a new attribute to the first object, a type of the new attribute being the same as or associated with the type or the collection type of the second object. The replacing an attribute type of the first foreign key with the type of the second object may include: replacing an attribute type of a first attribute used as the first foreign key in the data structure of the first object with the type of the second object. When a count of second objects represented by the foreign key is two or more, constructing the first object including information of the second object by performing an attribute definition operation on the first object may further include: in response to a selection instruction of the user, determining a second object selected by the selection instruction from the two or more second objects.

The present disclosure provides a non-transitory computer readable medium that may include executable instructions. When executed by at least one processor, these instructions may direct the at least one processor to perform a method. The method may include: in response to an object definition instruction input by a user, obtaining the ER information. The ER information may represent a relationship between a first object and a second object through a foreign key, where each of the first object and the second object may be a data structure corresponding to a data table. Constructing the first object including information of the second object may be performed by performing an attribute definition operation on the first object. The attribute definition operation may include: in response to determining that the foreign key satisfies a first preset condition, processing an attribute type of the first object or adding a new attribute of the first object. This may include: in response to determining that the first object includes a first foreign key pointing to the second object, adding an attribute of a type of the second object to the first object or replacing an attribute type of the first foreign key with the type of the second object. Alternatively, in response to determining that the second object includes a second foreign key pointing to the first object, adding to the first object an attribute of the type of the second object or an attribute of a collection type of the second object. Adding to the first object an attribute of a type of the second object or an attribute of a collection type of the second object may include: adding a new attribute to the first object, where a type of the new attribute may be the same as or associated with the type or the collection type of the second object. Replacing an attribute type of the first foreign key with the type of the second object may include: replacing an attribute type of a first attribute used as the first foreign key in the data structure of the first object with the type of the second object. When a count of second objects represented by the foreign key is two or more, constructing the first object including information of the second object by performing an attribute definition operation on the first object may further include: in response to a selection instruction of the user, determining a second object selected by the selection instruction from the two or more second objects.

Additional features may be set forth in part in the description which follows, and in part may become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a schematic diagram illustrating an exemplary system for object definition based on ER information according to some embodiments of the present disclosure;

FIG. 3 is a flowchart illustrating an exemplary object definition process based on ER information according to some embodiments of the present disclosure;

DETAILED DESCRIPTION

Figure 1:
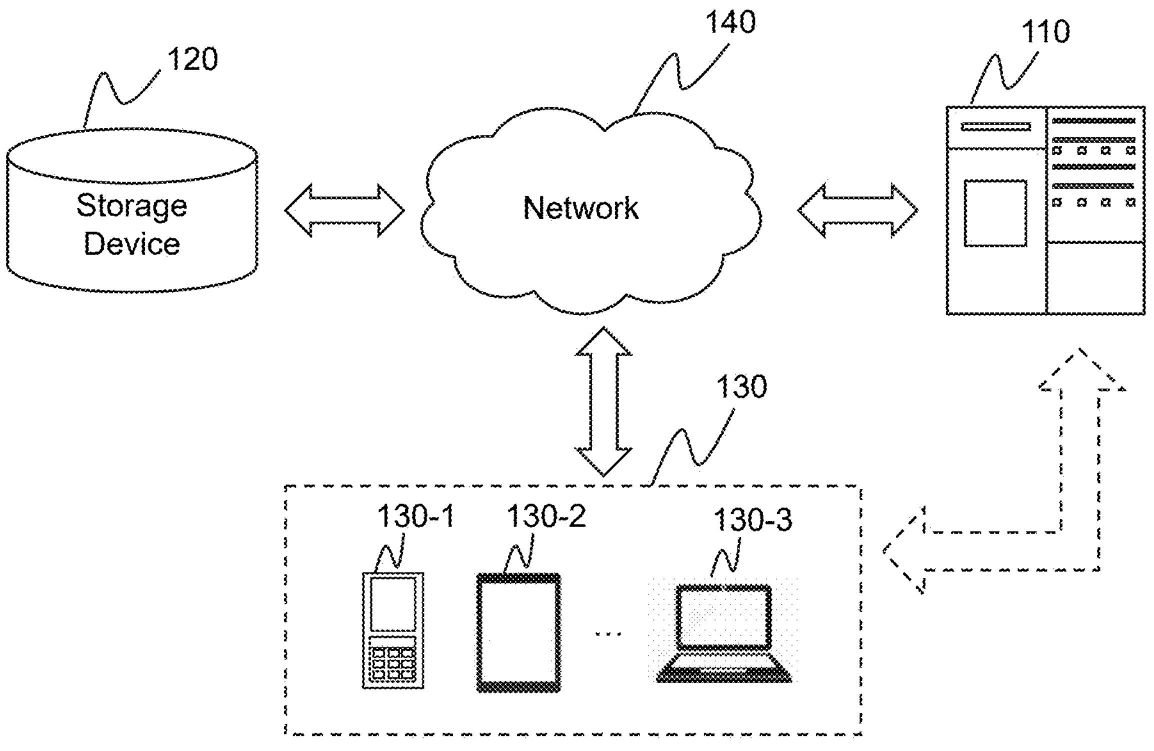
FIG. 1 is a schematic diagram illustrating an exemplary system for object definition based on ER information according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms “system,” “engine,” “unit,” “module,” and/or “block” used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms “a,” “an,” and “the” may be intended to include the plural forms as well, unless the context clearly indicates otherwise. It will be further understood that the terms “include” and/or “comprise,” when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. In the present disclosure, the item “code” may also refers to “source code.”

These and other features, and characteristics of the present disclosure, and the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In the field of database technology, for the task of mapping table information and table association information in a database into objects in a source code, some traditional solutions (e.g., Mybatis, Hibernate, etc.) provide a mapping mechanism from the database to the objects, but the traditional solutions require developers to write the code directly and mark the mapping relationship between the objects and the database tables in the source code. The traditional solutions are cumbersome and error-prone, increasing development costs and time. In addition, some tools (e.g., MyBatis Generator, JHipster, etc.) can automatically generate an object code based on the Entity-Relationship (ER) of the database using fixed logic. However, the objects generated by these tools do not allow users to define the scope of tables for the objects. The objects generated by these tools either represent a single data table or represent all associated tables, thus cannot effectively and freely express composite relationships among multiple tables. This presents a significant limitation in practical development because complex business logic often requires appropriately defined objects, and too little table data may lead to insufficient information, while too much table data may cause issues with transmission performance and database performance.

The present disclosure provides a method, a system, and a storage medium for object definition based on ER information. The method for object definition based on ER information includes, in response to an object definition instruction input by a user, obtaining the ER information, wherein the ER information represents a relationship between a first object and a second object through a foreign key, and each of the first object and the second object is a data structure corresponding to a data table; constructing the first object including information of the second object by performing an attribute definition operation on the first object, wherein the attribute definition operation includes: in response to determining that the foreign key satisfies a first preset condition, processing an attribute type of the first object, or adding a new attribute of the first object, including: in response to determining that the first object includes a first foreign key pointing to the second object, adding an attribute of a type of the second object to the first object, or replacing an attribute type of the first foreign key with the type of the second object; or in response to determining that the second object includes a second foreign key pointing to the first object, adding, to the first object, an attribute of the type of the second object or an attribute of a collection type of the second object; the adding, to the first object, an attribute of a type of the second object or an attribute of a collection type of the second object includes: adding a new attribute to the first object, a type of the new attribute being the same as or associated with the type or the collection type of the second object; and the replacing an attribute type of the first foreign key with the type of the second object includes: replacing an attribute type of a first attribute used as the first foreign key in the data structure of the first object with the type of the second object; and when a count of second objects represented by the foreign key is two or more, the constructing the first object including information of the second object by performing an attribute definition operation on the first object further includes: in response to a selection instruction of the user, determining a second object selected by the selection instruction from the two or more second objects.

According to some embodiments of the present disclosure, by responding to an object definition instruction inputted by a user, it is possible to construct, by combining ER information, a combination of several objects based on a foreign key relationship, thus replacing a large count of coding operations with a small count of defining operations, which not only greatly improves the work efficiency of the user, but also makes the whole process simpler, more intuitive, and less prone to error. Compared with the existing object description scheme, the method for object definition based on ER information in the present disclosure has higher flexibility, not only describing the combination of object relationships, but also allowing the user to define the attributes of the object through a plurality of attribute definition operations to create complex and business-logical table combination objects, thus better meeting the requirements of practical application scenarios; furthermore, the combination relationship expressed by these objects may be quickly reused in subsequent expressions of the table combination objects, making subsequent expressions of the combinations efficient and continuous. The aforementioned flexibility enables the method for object definition based on ER information to better adapt to various complex business scenarios and provide more accurate data support for users. This method clarifies and enhances the accuracy of relevant information by explicitly expressing the combined relationship of objects as described above. This explicit expression may serve as the core data source for other functions such as data retrieval logic, object complexity analysis, etc., and improves the maintainability and extensibility of the code.

In order to facilitate the understanding of the technical solutions provided in the present disclosure, some of the concepts addressed in the present disclosure are described below.

Entity-Relationship (ER) refers to entities, entity attributes, and relationships between the entities, and is usually represented by an ER diagram. The ER diagram is a graphical tool for describing entities, entity attributes, and relationships between the entities, and is primarily used in database design. The ER diagram represents the structure of information by means of three basic elements: entity, attribute, and relationship. The entity describes an object or concept that is distinguishable in the real world, e.g., student, course, etc. The attribute describes a characteristic or feature of an entity and includes the name of the attribute and the possible data types, e.g., the name of a student, a student number, etc. The relationship reflects interactions between the entities, the relationship may be one-to-one, one-to-many, or many-to-many, e.g., a course selection relationship between a student and a course.

A table is a data structure configured to structurally represent/store data in a database. The table consists of rows (corresponding to records) and columns (corresponding to attributes), where each column has a specific data type and each row is a single data record with all columns.

Regarding to a primary key, a unique key, and a foreign key, a column (or combination of columns) is configured to uniquely identify a record in some tables, this column (or combination of columns) is known as the primary key (or unique key), and a column (or combination of columns) that is configured to store the primary key (or unique key) of another table (or other rows of data in the table) is known as the foreign key from that table (the former table) to the other table (the latter table). The association relationship between the two tables is determined and maintained through the primary key and foreign key. For example, such the association relationship may include the following: a 1:1 relationship indicates that the data of up to one former table is associated with the same data of a latter table, and that the data of up to one latter table is associated with the same data of the former table; an n:1 relationship indicates that the data of more than one former table is associated with the same data of the latter table and that the data of up to one latter table is associated with the same data of the former table. The ER information includes information indicating association between the table information and the table by the primary key and the foreign key.

An object is a data structure that includes a plurality of attributes. Each attribute has a specific type, which may be some base type, e.g., string, integer, float, etc., or an object, or a collection type of the base type or object. In the present disclosure, the object refers to an object in the database domain, whereas in the programming domain, the object refers to a data structure including attributes and operations. For example, in the database domain, the object may be a data structure including a user identity (ID), a username, and a data structure of the user residential address; and in the programming domain, the object may be a data structure including a user ID, a username, and a user residential address, and data structures that perform input, edit, and output operations on these attributes.

An object corresponding to a table refers to an object configured to represent a structure of the table (also known as the corresponding object of the table). This object includes at least the attributes that have a mapping relationship with the primary key (or unique key) of the table. In this expression, the type of the attribute serves as an alternative representation of the column type. For example, “string” corresponds to “varchar”, “text”, or similar types in the table, which may all be expressed as string types. The foreign key attribute type may be expressed as the original information of the database, e.g., the primary key (or unique key) information of the latter table of type Long, or as the corresponding object of the latter table, so that the information of the latter table may be introduced in this object. If the table corresponding to two objects includes a foreign key representation, it may also be understood that there is a foreign key representation between the two objects. When the former table has a foreign key to the latter table, it may also be understood there is both a first foreign key representation from the corresponding object in the former table to the corresponding object in the latter table (foreign key forward association) and a second foreign key representation from the corresponding object in the latter table to the corresponding object in the former table (foreign key reverse association).

An instance of an object (also referred to as an object instance) is a specific data item that corresponds to specific table data and satisfies the object data structure, for example, a user object with ID=1 may be known as an instance of the object user.

FIG. 1 is a schematic diagram illustrating an exemplary system for object definition based on ER information according to some embodiments of the present disclosure. As shown in FIG. 1, the system 100 includes a processing device 110, a storage device 120, one or more terminals 130, and a network 140. In some embodiments, the processing device 110, the storage device 120, and/or the terminal(s) 130 are connected to and/or communicate with each other via a wireless connection, a wired connection, or a combination thereof.

The processing device 110 processes information and/or data relating to the system 100 to perform one or more functions described in the present disclosure. In some embodiments, the processing device 110 may execute a first instruction stored in the storage device 120 to perform an operation described in some embodiments of the present disclosure. For example, in response to an object definition instruction input by a user, the processing device 110 may obtain the ER information. The ER information represents an association relationship between the first object and the second object through foreign key representation. The first object and the second object are both data structures corresponding to data tables. The processing device 110 may perform an attribute definition operation on the first object, constructing the first object containing the information of the second object. The attribute definition operation includes in response to the foreign key satisfying a first preset condition, operating an attribute type of the first object or adding attributes of the first object. The attribute definition operation includes, in response to a determination that the first object includes a first foreign key pointing to the second object, adding an attribute with a type of the second object to the first object, or replacing an attribute type of the first foreign key with the type of the second object; in response to a determination that the second object includes a second foreign key pointing to the first object, adding an attribute of the type of the second object or an attribute of a collection type of the second object to the first object. The adding an attribute of the type of the second object or an attribute of a collection type of the second object to the first object includes: adding a new attribute to the first object, a type the new attribute being the same as or associated with the type of the second object or the collection type of the second object. The replacing an attribute type of the first foreign key with the type of the second object includes: replacing an attribute type of a first attribute used as the first foreign key in a data structure of the first object with the type of the second object. When a count of second objects satisfying the foreign key representation is two or more, the constructing the first object containing the information of the second object by performing an attribute definition operation on the first object further includes: in response to a selection instruction of the user, determining a second object selected by the selection instruction from the two or more second objects.

In some embodiments, the processing device 110 may be a single server or a server group. The server group may be centralized or distributed. In some embodiments, the processing device 110 may be local or remote from the system 100. In some embodiments, the processing device 110 may be implemented on a cloud platform. In some embodiments, the processing device 110 or a portion of the processing device 110 may be integrated into the terminal(s) 130. It should be noted that the processing device 110 in the present disclosure may include one or a plurality of processors. Thus, operations and/or method steps that are performed by one processor may also be jointly or separately performed by the plurality of processors.

The storage device 120 may store data, instructions, and/or any other information. In some embodiments, the storage device 120 may store data obtained from the imaging device 110, the processing device 110, and/or the terminal(s) 140. In some embodiments, the storage device 120 may store data (e.g., databases, etc.) and/or instructions (e.g., first instructions, etc.) that the processing device 110 may execute or use to perform exemplary methods described in the present disclosure. In some embodiments, the storage device 120 may include a mass storage device, a removable storage device, a volatile read-and-write memory, a read-only memory (ROM), or the like, or a combination thereof. In some embodiments, the storage device 120 may be implemented on a cloud platform. In some embodiments, the storage device 120 may be part of the processing device 110, and/or the terminal(s) 130.

The terminal(s) 130 may be configured to enable a user interaction between a user and the system 100. In some embodiments, the terminal(s) 130 may be connected to and/or communicate with the processing device 110, and/or the storage device 120. In some embodiments, the user may send instructions (e.g., object definition instructions, selection instructions, data retrieval instructions, source code generation instructions, etc.) to the processing device 110 via the terminal(s) 130 to cause the processing device 110 to perform the operations described in some embodiments of the present disclosure. In some embodiments, the terminal(s) 130 may include a mobile device 130-1, a tablet computer 130-2, a laptop computer 130-3, or the like, or a combination thereof. In some embodiments, the terminal(s) 130 may be part of the processing device 110.

The network 140 may include any suitable network that may facilitate the exchange of information and/or data for the system 100. In some embodiments, one or more components of the system 100 (e.g., the processing device 110, the storage device 120, the terminal(s) 130, etc.) may communicate information and/or data with one or more other components of the system 100 via the network 140.

It should be noted that the above description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. In some embodiments, the system 100 may include one or more additional components and/or one or more components described above may be omitted. Additionally or alternatively, two or more components of the system 100 may be integrated into a single component. For example, the storage device 120, the terminal(s) 130, and the network 140 may be integrated into the processing device 110. As another example, a component of the system 100 may be replaced by another component that may implement the functions of the component. However, those variations and modifications do not depart from the scope of the present disclosure.

FIG. 2 is a schematic diagram illustrating an exemplary system for object definition based on ER information according to some embodiments of the present disclosure. As shown in FIG. 2, the system 200 includes an instruction acquisition module 210, an ER information acquisition module 220, and an attribute definition operation module 230. In some embodiments, the modules of the system 200 may be implemented by a processing device 110.

The instruction acquisition module 210 is configured to acquire user-input instructions, such as an object definition instruction, a selection instruction, a data retrieval instruction, a code generation instruction, or the like. More descriptions of the obtaining of user-input instructions may be found elsewhere in the present disclosure (e.g., operation S310, operation S410, and the descriptions thereof).

The ER information acquisition module 220 is configured to obtain the ER information in response to a user-input object definition instruction. The ER information represents an association relationship between the first object and the second object through foreign key representation. Both the first object and the second object are data structures corresponding to the data table. More descriptions of the obtaining of the ER information may be found elsewhere in the present disclosure (e.g., operation S310, operation S420, process 500 and the descriptions thereof).

The attribute definition operation module 230 is configured to perform an attribute definition operation on the first object for constructing a first object including information of the second object. The attribute definition operation includes processing an attribute type of the first object in response to a foreign key satisfying a preset condition, and/or, adding an attribute of the first object. More descriptions of the constructing of the first object may be found elsewhere in the present disclosure (e.g., operation S320, operation S420, process 500 and the descriptions thereof).

It should be noted that the above descriptions of the system 200 are provided for the purposes of illustration, and are not intended to limit the scope of the present disclosure. For persons having ordinary skills in the art, various modifications and changes in the forms and details of the application of the above system may occur without departing from the principles of the present disclosure. In some embodiments, the system 200 may include one or more other modules and/or one or more modules described above may be omitted. Additionally or alternatively, two or more modules may be integrated into a single module and/or a module may be divided into two or more units. However, those variations and modifications also fall within the scope of the present disclosure.

Figure 3:
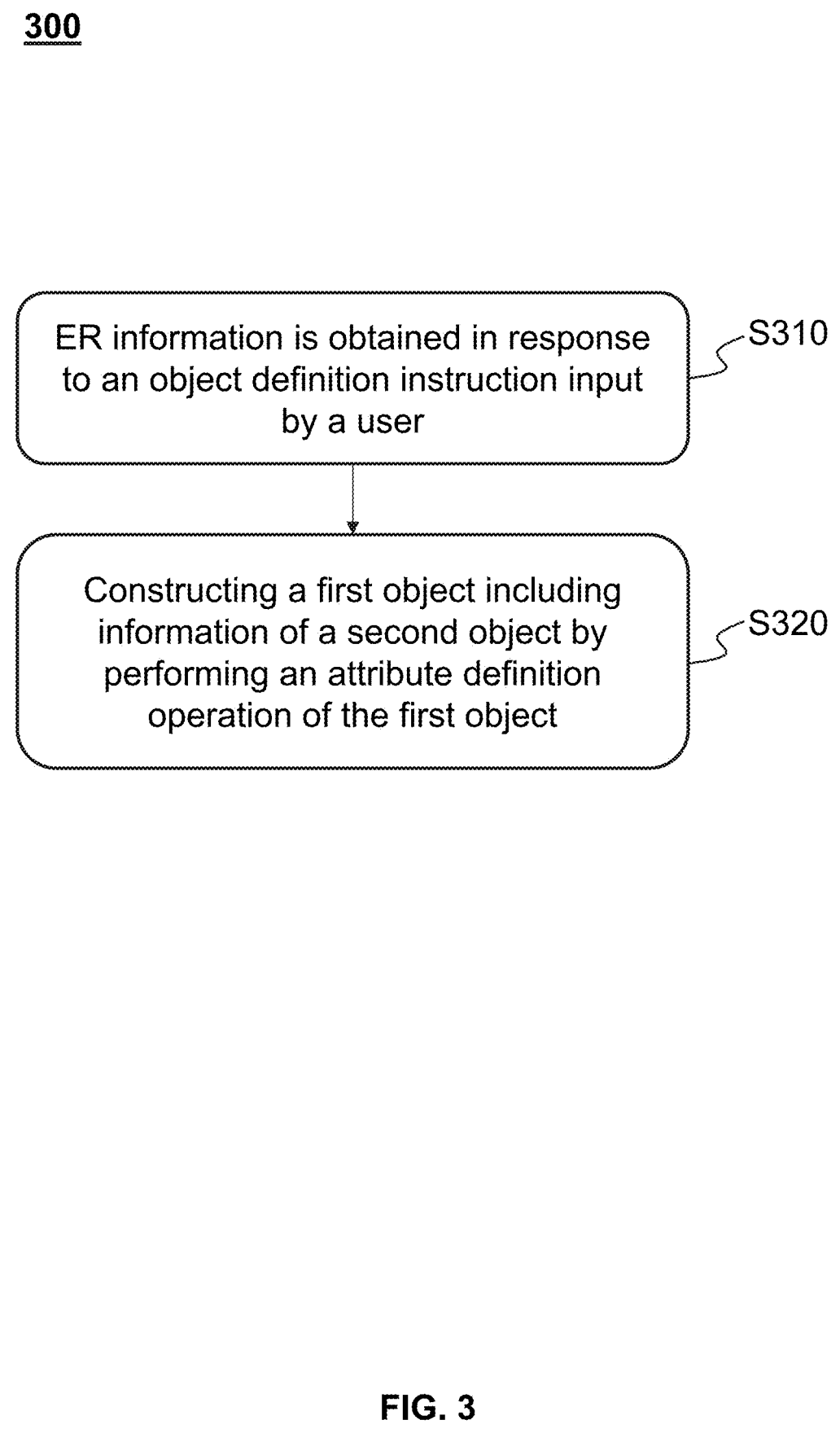

FIG. 3 is a flowchart illustrating an exemplary object definition process based on ER information according to some embodiments of the present disclosure. In some embodiments, process 300 may be executed by the system 100 and/or the system 200. For example, the process 300 may be implemented as a set of instructions (e.g., the first instructions) stored in a storage device (e.g., the storage device 120 illustrated in FIG. 1). In some embodiments, the processing device 110 of the system 100 and/or one or more modules of the system 200 may execute the set of instructions and may accordingly be directed to perform the process 300.

In S310, ER information is obtained in response to an object definition instruction input by a user. In some embodiments, S310 is performed by the ER information acquisition module 220.

A first object refers to an object currently being processed. A second object is an object corresponding to a table that has a foreign key association (a foreign key forward association or a foreign key reverse association) with the first object. Each of the first object and the second object is a data structure that corresponds to a data table. For example, each of the first object and the second object may be an object including at least one field in a data table. A field is an attribute in an object. The ER information represents an association relationship between the first object and the second object by means of a foreign key, i.e., an association relationship between two tables respectively corresponding to the first object and the second object is determined by the foreign key. This association allows the user to track and manage the relationship between different data tables through foreign keys. In some embodiments, when processing data, the processing device 110 may add a new attribute to the first object based on the association relationship. This new attribute may be a type of a second object, or a type of a collection type of the second object, where a collection attribute may include not only a plurality of instances of the second object represented as an array or a list, but also complex relationships or nested combinations of the plurality of instances of the second object.

The object definition instruction is an instruction for defining an object, e.g., defining a target object, etc. In some embodiments, the object definition instruction includes attribute information of an object that needs to be defined, e.g., attribute information of the first object. The object definition instruction is input via a non-coding manner, wherein the non-coding manner includes at least one of the following: user interface selection, a writing description files, optical character recognition (OCR), image recognition, voice input, and natural language input, or the like. The user interface selection allows a user to complete the object definition through intuitive point-and-click and configuration; writing description file facilitates users who are accustomed to textual descriptions; the OCR and image recognition techniques are capable of automatically extracting key information from images, which in turn generates the object definition; the voice input provides options for those who dictate more clearly; and the natural language input is parsed into the object definition by devices or appliances such as artificial intelligence (AI). In some embodiments, other instructions (e.g., selection instructions, data retrieval instructions, code generation instructions, etc.) may also be entered in a non-coding manner. Compared to traditional handwritten object descriptions, the use of the non-coding manner effectively avoids errors that may be caused by human penmanship or comprehension bias, and eliminates the need for complex coding operations, which significantly reduces the operation difficulty; at the same time, because the non-coding manner is more intuitive and flexible, the accuracy and efficiency of the definition of the object of the user has also been greatly improved.

In some embodiments, an instruction, such as the object definition instruction, may also be entered in other manners, for example, by manual or automated encoding manners, etc.

After obtaining the object definition instruction, the processing device 110 obtains a second object and corresponding ER information from a table of a database based on the information of the first object in the object definition instruction. For example, the processing device 110 may obtain database tables from the storage device 120, and obtain, from all the database tables, a table having foreign key association with the first object, thereby determining the second object and the corresponding ER information. In some embodiments, the processing device 110 may construct a second object corresponding to the first object based on a table with which the first object has a foreign key association, for example, by using field information in the table as an attribute of the second object, thereby constructing the second object.

Merely by way of example, three tables are listed below, table 1 is an address table, table 2 is a user table, and table 3 is an id_card (identity card) table, wherein the ID in each table represents a primary key. The birth_address_id column in the user table has a 1:1 mapping relationship with the ID column in the address table, which indicates that a person may have at most one birth address, and one address is used as the birthplace of at most one person; the owner_user_id column in the id_card table has a 1:1 mapping relationship with the ID column of the user table, indicating that one identity card corresponds to at most one person, and one person corresponds to at most one identity card. Referring to the following structure and data of the tables, there are an association relationship in the three tables determined by a foreign key, and according to the association relationship, it allows users to define, based on requirements, objects that meet the needs of different combinations of data.

TABLE 1

| address table | | |
|---|---|---|
| ID | Province | Detail |
| 1 | beijing | chaoyang |
| 2 | shanghai | waitan |

TABLE 2

| user table | | |
|---|---|---|
| ID | Name | birth_address_id |
| 11 | xz | 1 |
| 12 | cc | 2 |

TABLE 3

| id_card table: | | |
|---|---|---|
| ID | Number | owner_user_id |
| 21 | s1234 | 12 |
| 22 | s5678 | 11 |

The first object may correspond to any one of the user table, address table, or id_card table, depending on the business scenario of the user. For example, if the user is looking at a foreign key of birth_address_id in the user table, since the birth_address_id column in the user table has a mapping relationship to the ID column in the address table, the first object corresponds to the user table, the second object corresponds to the address table, and there is a first foreign key representation from the first object to the second object (foreign key forward relationship, i.e., foreign key field information is stored in the table corresponding to the first object).

The data structure of the first object, user_simple_dto, corresponding to the user table is as follows:

```
user_simple_dto {
  Long id; //primary key
  String name;
  Long birth_address_id;
  }.
```

where user_simple_dto maps the data structure in the user table, including primary key ID, name, and birth address of birth_address_id.

The data structure of the second object, address_dto, corresponding to the address table is as follows:

```
address_dto {
  Long id; //primary key
  String province;
  String detail;
  }.
```

where address_dto maps the data structure in the address table including primary key ID, province, and detail address.

In S320, the first object including information of the second object is constructed by performing an attribute definition operation of the first object. In some embodiments, S320 is performed by the attribute definition operation module 230.

The attribute definition operation on the first object includes, in response to determining that the foreign key satisfies a preset condition, processing an attribute type of the first object, and/or adding a new attribute of the first object. The preset condition includes existence of a first foreign key in the first object pointing to the second object (also referred to as a foreign key forward relationship, i.e., the foreign key field information is stored in a table corresponding to the first object) or existence of a second foreign key in the second object pointing to the first object (also referred to as a foreign key reverse relationship, i.e., the foreign key field information is stored in a table corresponding to the second object).

In some embodiments, the existence of the first foreign key in the first object pointing to the second object includes the followings. A table corresponding to the first object includes a first column used as the first foreign key, and a table corresponding to the second object includes a second column used as a primary key, wherein the first column and the second column have a mapping relationship such that an association relationship between the first object and the second object is determined by the first column. In some embodiments, the existence of the first foreign key in the first object pointing to the second object includes the followings. A first attribute in a data structure of the first object is used as the first foreign key, and a second attribute in a data structure of the second object is used as a first primary key, wherein the first attribute and the second attribute have a mapping relationship, thereby determining an association relationship between the first object and the second object through the first attribute. For example, in the first object, user_simple_dto, corresponding to the user table, there is a foreign key, birth_address_id, pointing to the second object, address_dto, corresponding to the address table, which corresponds to the primary key ID in the address table, i.e., there is a first foreign key, birth_address_id, in the first object that points to the second object.

In some embodiments, the existence of the second foreign key in the second object pointing to the first object includes the followings. A table corresponding to the second object includes a third column used as the second foreign key, and a table corresponding to the first object includes a fourth column used as a primary key, wherein a mapping relationship exists between the third column and the fourth column, thereby determining an association relationship between the second object and the first object by the second foreign key. In some embodiments, the existence of the second foreign key in the second object pointing to the first object includes the followings. When a third attribute in the data structure of the second object serves as the second foreign key, and a fourth attribute in the data structure of the first object serves as the second primary key, the third attribute of the second object and the fourth attribute of the first object have a mapping relationship, thereby determining an association relationship between the second object and the first object by the second foreign key.

The first object that includes information of the second object is a first object that includes an attribute of a type of the second object, and the first object that includes the information of the second object may be referred to as a target object. In response to the existence of the first foreign key in the first object pointing to the second object, the processing device 110 may process the attribute type of the first object, and/or add a new attribute of the first object. Processing the attribute type of the first object includes operations such as modifying, or replacing, etc., for an attribute type originally present in the first object. Adding a new attribute of the first object includes adding a new attribute to the first object.

In some embodiments, in response to the existence of a first foreign key in the first object pointing to a second object, the processing device 110 may add an attribute of a type of the second object to the first object, and/or replace the attribute type of the first foreign key with the type of the second object.

Adding an attribute of the type of the second object to the first object means adding a new attribute to the first object, where the type of the new attribute is the same as or associated with the type of the second object or the collection type of the second object. This preserves the original foreign key attribute while providing a more direct way to access the associated second object.

Merely by way of example, in constructing the first object, user_detail_dto, including information of the second object, address_dto, if the attribute definition instruction of the user includes an adding instruction, in response to the attribute definition instruction, the processing device 110 may determine that the user_detail_dto (corresponding to the user table) points to address_dto (corresponding to the address table) via birth_address_id, specifically to the ID in the address table. Further in response to the adding instruction, the processing device 110 may add an attribute, address_dto, of the type of the second object, address_dto, in the first object, user_detail_dto, as birth_address to obtain a new first object, user_detail_dto, with the following data structure:

```
user_detail_dto {
  Long id; //primary key
  String name;
  Long birth_address_id;
  address_dto birth_address; //new attribute based on Long
  birth_address_id
  }.
```

By adding an attribute of a type of the second object, address_dto, it may be realized that when accessing the first object, user_detail_dto, which includes information of the second object, the detailed information of the objects corresponding to the address table may be directly obtained; at the same time, since birth_address_id is also retained in this first object, user_detail_dto, this guarantees some flexibility, allowing for direct use of birth_address_id when needed, for example, for database queries or interaction with other systems.

Replacing the attribute type of a first foreign key with a type of the second object means replacing the attribute type of the first attribute in a data structure of the first object that serves as the first foreign key with a type of the second object. This enables the first object to hold or reference the second object directly, rather than just an identifier, making access to the second object more direct.

Merely by way of example, in constructing the first object, user_detail_dto, including information of the second object (address_dto), in response to the attribute definition instruction of the user, the processing device 110 determines that user_detail_dto (corresponding to the user table) is pointing to address_dto (corresponding to the address table) via birth_address_id, specifically pointing to the ID in the address table. The processing device 110 may replace birth_address_id, the type Long of the foreign key attribute to address, with the second object, address_dto, yielding:

```
user_detail_dto {
  Long id; //primary key
  String name;
  address_dto birth_address; //from Long birth_address_id substitution
  }.
```

When a user needs to get detailed information and associated birth address information of a person, such as province, the first object, user_detail_dto, may be constructed and used. By replacing the attribute type of birth_address_id with the type of address_dto, which allows the first object to refer directly to an instance of the second object, rather than just referencing an ID pointing to the second object, thus allowing the user to get the birth address information directly without having to query the address table again.

As another example, assuming that the first object corresponds to the id_card table, the two objects, user_simple_dto and user_detail_dto, that have already been constructed based on the above-mentioned user table when constructing the first object related to id_card may form a second object candidate set (user_simple_dto, user_detail_dto), and the second object is one of the objects in the second object candidate set, resulting in the following three construction scenarios, which provide different levels of information granularity and flexibility. The three scenarios are specified as follows.

a. When constructing the data structure of the first object, id_card_simple_dto, that corresponds to id_card table and does not include the information of the second object, the processing device 110 may choose not to add a new attribute nor replace owner_user_id, thereby obtaining an object of:

```
id_card_simple_dto {
  Long id; //primary key
  String number;
  Long owner_user_id;
  }.
```

where the constructed first object, id_card_simple_dto, includes only basic information about id_card and a foreign key to the user table (i.e., there is a first foreign key in the first object pointing to the second object), and does not include detailed information about the user table. The first object, id_card_simple_dto, is suitable for scenarios in which it is only necessary to know the relationship between the identity card and the person, without needing specific information about the person.

b. In constructing the first object, id_card_detail_dto, that includes the information of the second object, in response to the attribute definition instruction of the user, the processing device 110 may select the second object candidate set of user_detail_dto as the second object, replacing the type of the owner_user_id field with user_detail_dto to obtain an object of:

```
id_card_detail_dto {
  Long id; //primary key
  String number;
  user_detail_dto owner_user ;
  }.
```

where id_card_detail_dto includes the detailed information of the id_card and detailed information of the person, and the address information of the person (via user_detail_dto). Objects such as id_card_detail_dto provide the most comprehensive data information and are suitable for scenarios that require an in-depth understanding of the detailed information of id_card and its owner.

c. In constructing the first object, id_card_abstract_dto, that includes the information of the second object, in response to the attribute definition instruction of the user, the processing device 110 may select user_simple_dto in the second object candidate set as the second object by replacing the field type of the owner_user_id with user_simple_dto to obtain an object of:

-continued

```
id_card_abstract_dto {
  Long id; //primary key
  String number;
  user_simple_dto owner_user;
  }.
```

where id_card_abstract_dto includes the detailed information of the id_card and basic information about the person (via user_simple_dto). Objects such as id_card_abstract_dto are suitable for scenarios where the basic information about the id_card and its owner is needed, but not need the address information of the id_card owner.

Based on the various combination schemes created for objects related to id_card, it is clear that this combination of objects based on the foreign key relationship defined program is very flexible and may be defined according to actual needs to meet the different combinations of different tables. And, the combination relationships expressed by these objects can be quickly reused in the object expressions of subsequent table combinations, making subsequent combination expressions efficient and continuous. These objects can be mapped to table structures in the database, making data access more efficient and structured. Additionally, these objects may be easily converted to a code in a variety of programming languages, simplifying the development of the data access layer.

In some embodiments, in response to the existence of a second foreign key in the second object pointing to a first object, the processing device 110 may add an attribute of a type of the second object or an attribute of a collection type of the second object to the first object.

Merely by way of example, if the address table is taken as the table corresponding to the first object and the user table as the table corresponding to the second object, there is a second foreign key representation between the first object and the second object (a foreign key reverse relationship, i.e., the foreign key field information is stored in the table corresponding to the second object). When constructing the first object address_with_user_dto that includes the information of the second object, in response to the attribute definition instruction of the user, the processing device 110 may add an attribute, owner_user_simple, of the type, user_simple_dto, corresponding to the user table in the first object, address_with_user_dto, based on the second foreign key representation of the user table, introduce the information of the user table in reverse, and obtain an object of:

```
address_with_user_dto {
  Long id; //primary key
  String province;
  String detail;
  user_simple_dto owner_user_simple; //newly introduced field by
extending user->address relationship in reverse
  }.
```

In this case, the object, address_with_user_dto, not only includes the basic fields of the address table (e.g., ID, province, and detail), but also introduces basic information about the person associated with the address through the new field of owner_user_simple. The field of owner_user_simple is of the type, user_simple_dto, which represents basic information about the person and thus reverses the relationship from the user table to the address table, enabling users to directly obtain the personnel information associated with this address from the address information.

As another example, the address table is used as the table corresponding to the first object, and the user table is used as the table corresponding to the second object. When it is necessary to obtain an object instance of the address_with_user_dto for a specific address (for example, id=1) from the database, the processing device 110 may execute a query to obtain the relevant rows of information from the address table and the user table, which is based on the address ID and the foreign key, birth_address_id, to query the two tables. In the actual query process, a user may use different query techniques, such as sql join operations, cross-module service calls, or the like, to retrieve the relevant data from the address and user tables according to specific needs. After the query is completed, the processing device 110 may assemble the object instance of address_with_user_dto. This object instance includes information about the address and an attribute, owner_user_simple, of the type of the second object, user_simple_dto, and the assembled object, address_with_user_dto, is returned to the user. In this way, the user is able to access basic information about the person associated with the address while obtaining the address information. The final obtained object of address_with_user_dto is as follows:

```
address__with__user__dto {
  id: 1
  province: 'beijing'
  detail: 'chaoyang'
  owner__user__simple: user__simple__dto {
    id: 11
    name: 'xz'
  }
}.
```

With the above operations, an attribute of the type of the first object, user_simple_dto, is introduced in the second object corresponding to the address table, which includes the address information (id, province, detail) and the object of user_simple_dto that is introduced by reverse association. This reverse extension improves data relevance and access efficiency, making it easier and more efficient to deal with the address and the personnel information when it is needed simultaneously. In this way, it is possible to flexibly establish reverse associations between objects according to business needs and define different levels of objects to adapt to different data access scenarios.

In some embodiments, a 1: n situation occurs in the reverse extension, where an attribute is introduced in the first object, and the type of the introduced attribute is a collection (e.g., a list, an array, etc.) for storing a plurality of second object instances associated with the first object instance. In this way, when querying a person, it can directly get information about all the things owned by the person without having to do a plurality of database queries.

Merely by way of example, in table 4, the dog table, shown below, a 1: n relationship between a person and a dog is expressed through the foreign key, owner_user_id, i.e., a person may own a plurality of dogs and a dog belongs to at most one person.

TABLE 4

Dog table:

| ID | Color | owner__user__id |
|---|---|---|
| 31 | green | 11 |
| 32 | red | 11 |
| 33 | white | 12 |

When constructing the first object, user_with_dog_dto, corresponding to the user table, because there is a second foreign key from the second object corresponding to the dog table that represents a 1: n relationship, the processing device 110 may add an attribute of the collection type of a second object to the first object to get an object of:

```
user__with__dog__dto {
  Long id; //primary key
  String name;
  Long birth__address__id;
  List<dog__dto> dogs; //newly introduced field by back-extending the
(array) relationship of dog->user}.
```

It is possible to easily represent and process information about a plurality of dogs owned by a single person by means of reverse insertion. It is possible to flexibly store, query, and modify information about dogs owned by a person by introducing the dogs attribute of the type of List<dog_dto>.

In some embodiments of the present disclosure, when the count of second objects that satisfy the foreign key representation is two or more, in response to a selection instruction of the user, the processing device 110 may determine, from the two or more second objects, the second object selected by the selection instruction to construct a first object including the information of the second object.

When the user is confronted with an object candidate set including a plurality of second objects, the user may select a second object through a selection instruction according to the needs and preferences of the user. In the process of constructing the first object including the information of the second object, the selection of the user is critical, and by responding to the selection instruction of the user, the processing device 110 may determine, from two or more second objects, a particular second object selected by the user to construct the first object including the information of the second object. For example, if the user selects a particular second object through the interface to be used with the construction of the first object including the information of the second object, after confirming this selection, the construction of the first object begins. This constructed first object including the information of the second object inherits the attributes and features of the first object and the second object to form a new, more complex object. This process allows the user to select a suitable second object from a plurality of candidate second objects to construct a first object including the information of the second object, thereby meeting the specific data processing or information combination needs of the user. This flexibility and customizability allow better adaptation to different application scenarios and user needs.

In some embodiments of the present disclosure, by adding an attribute of a type of the second object to a first object by means of addition or substitution, it becomes possible to manage and access the second object associated with the first object more flexibly, or to recursively retrieve all the associated objects within the collection type of the second object without having to query the database via the foreign key each time. This approach improves data access efficiency and results in an code that is clearer and easier to maintain.

After constructing the first object including the information of the second object, the processing device 110 may generate a code corresponding to the first object including the information of the second object, wherein the source code may include a code corresponding to operations such as data acquisition, editing, saving, or the like in the first object. For example, the code may include a code to obtain the value of an attribute (e.g., name) in an instance of the first object, user_detail_dto. The code generation may be performed using any feasible means, e.g., a code generation tool, an AI model, etc., and the present disclosure does not impose any restrictions on the source code generation manner.

Prior to generating the code, the processing device 110 obtains a structure of the first object including the information of the second object, including attributes of the object (e.g., data type, name, access modifiers, etc.) and relationships between the objects (e.g., associations, aggregations, etc.). If the first object including the information of the second object includes other objects or sets, the processing device 110 may also recursively analyze these internal objects to ensure that the generated code accurately reflects this nested structure.

After generating the initial source code, the processing device 110 may perform a series of optimization operations, for example, reducing redundant source code, improving source code readability, source code formatting, or the like. The processing device 110 may also perform error checking to ensure that there are no syntax errors, naming conflicts, or other issues that may cause compilation failures, and ultimately output compliant source code that corresponds to the first object including the information of the second object.

In some embodiments of the present disclosure, the processing device 110 may generate, in response to a source code generation instruction, a code corresponding to a first object that includes the information of the second object. Generating the source code corresponding to the first object in response to the source code generation instruction enables generating the source code according to the needs of the user, which is well-suited to meet the needs of the user.

In some embodiments, after constructing the first object including the information of the second object, the processing device 110 may generate, based directly on the constructed first object, a code corresponding to the first object including the information of the second object. By directly generating the source code corresponding to the first object, it is possible to provide the source code as soon as possible when the user needs the source code, thereby improving coding efficiency.

In some embodiments, the source code corresponding to the first object including the information of the second object generated by the processing device 110 may include a code corresponding to a data retrieval operation, and the processing device 110 may perform data retrieval from a database by executing the source code to obtain the data corresponding to the object definition instruction.

In some embodiments, the data query in the data retrieval operation may include one of a single query and separate queries (a plurality of queries). The single query refers to a query statement (e.g., a structured query language (SQL) statement) that does all the operations needed to get the data corresponding to the query object out of the database. This reduces the count of interactions with the database and improves query efficiency, but increases the internal load on the database. The separate queries refer to breaking down a complex query into a plurality of simple queries to perform data retrieval gradually. This approach is generally more flexible, but may increase the count of database interactions, and require more time and resources to be consumed in assembling the data.

In some embodiments, the processing device 110 may determine a data retrieval manner corresponding to the data query manner based on the data query manner (single query or separate queries), and then generate a code corresponding to the first object based on the data retrieval manner.

The processing device 110 may combine the data corresponding to the object definition instruction into a first object instance and present the combination result to the user. The first object instance is a specific implementation of the first object, and the first object instance includes the data queried from the database.

In some embodiments, after constructing the first object including the information of the second object, the processing device 110 may evaluate the complexity degree of the object definition instruction. For example, the processing device 110 may determine the complexity degree of the object definition instruction based on a count of attribute types in the first object and an average correlation of the attribute types via a preset table. The complexity degree may be expressed by a numerical value, e.g., the complexity degree ranges from 1 to 100, where the larger the value, the higher the complexity degree; and the smaller the value, the lower the complexity degree. Merely by way of example, the first object that the user needs to query includes three attributes: name, age, and address, and the count of attribute types in the first object is 3. In the database, table 5 corresponding to name is associated with 10 other tables; table 6 corresponding to age is associated with 9 other tables; and table 7 corresponding to address is associated with 8 other tables. The average correlation of the attribute types is: $(10+9+8)\div 3$.

In response to determining that the complexity degree mees a preset condition, the processing device 110 may generate a plurality of candidate data retrieval parameters, wherein each of the plurality of candidate data retrieval parameters includes a query count and a query content. The query content includes at least one attribute of the first object. For example, the preset condition may be that the complexity degree does not exceed a preset threshold, in which the processing device 110 may adopt a single query, wherein the preset threshold may be set manually based on actual needs. For example, the processing device 110 may randomly generate a preset count of candidate data retrieval parameters, but the query count is less than or equal to the count of attribute types in the first object.

For each candidate data retrieval parameter, the processing device 110 may predict a total query time for the candidate data retrieval parameter. The processing device 110 may select the candidate data retrieval parameter with the least total query time as the target data retrieval parameter. The processing device 110 may generate a code based on the target data retrieval parameter, wherein the source code is configured to perform data retrieval from the database.

In some embodiments, the processing device 110 may predict, via a machine learning model, the total query time for the candidate data retrieval parameter based on the candidate data retrieval parameter, the complexity degree of the object definition instruction, the computing power of the database, the data amount in the database, and the correlation complexity of the database. The computing power of the database includes at least one of utilization of central processing unit (CPU), memory utilization, utilization of disk input/output (I/O), etc., of the database server. The correlation complexity of a database is the degree to which the tables in the database are related. For example, if the database includes tables 1 to 10, and the count of other tables associated with tables 1 to 10 is 7, 8, 6, 6, 4, 6, 4, 2, 1, and 0, respectively, the correlation complexity of table 1 in the database is 7÷10. The determination of the correlation complexity of other tables is similar to that of table 1, and the correlation complexity of the database includes the correlation complexity of tables 1-10. The machine learning models may include various models, for example, neural network (NN), deep neural network (DNN), recurrent neural network (RNN), or the like. The input of the machine learning model includes the candidate data retrieval parameters, the objects and the complexity degree of the objects, the computing power of the database, the data amount in the database, and the correlation complexity of the database. The output of the machine learning model includes the total query time of candidate data retrieval parameters. The training samples of the machine learning model include samples of each input parameter, and the training labels include the historical actual total query time corresponding to the sample candidate data retrieval parameters (i.e., historical candidate data retrieval parameters) in the training samples.

In some embodiments, the data retrieval operation may also be performed based on the data retrieval instruction. In response to the data retrieval instruction, the processing device 110 may obtain table data corresponding to the primary key of the first object and corresponding data of the second object through the foreign key representation between the first object and second object, and return and combine the obtained table data and corresponding data to the first object instance. For example, when receiving the data retrieval instruction for any one of the objects, the processing device 110 may query the table data corresponding to the object itself through the primary key of the object and query the corresponding data from other tables corresponding to other objects through the foreign key representation, and combine and return all the queried data to the object instance. The above data retrieval operation expresses a relationship/constraint, which is a user defined manner of associated tables. The data query includes at least one of a direct query, a recursive query, or the like. Through the direct query or the recursive query with assembling return, it is possible to construct complex composite objects with cascading and nesting relationships to meet different data presentation and analysis needs.

Merely by way of example, in response to a data retrieval instruction, the processing device 110 may obtain a first object instance (id_card_simple_dto) with id=21:

```
id_card_simple_dto {
  id: 21
  number: 's1234'
  owner_user_id: 12
}.
```

wherein this object instance of id_card_simple_dto includes only the basic information of the identity card, such as ID, number, and owner_user_id. The owner_user_id in the basic information is a simple field that represents the person ID of the identity card owner.

As another example, in response to the data retrieval instruction, the processing device 110 may obtain, based on the foreign key data, owner_user_id, of the first object instance, id_card_abstract_dto, the corresponding data of the instance of the second object, user_simple_dto, return and combine the obtained corresponding data of the instance of the second object, user_simple_dto, into the instance of the first object, id_card_abstract_dto, and the final combined instance of id_card_abstract_dto is as follows:

```
id_card_abstract_dto {
  id: 21
  number: 's1234'
  owner_user: user {//owner_user_id has been converted to the
corresponding object of user_simple_dto
    id: 12
    Name: 'cc'
    birth_address_id: 2
  }
}.
```

wherein the object of id_card_abstract_dto not only includes its own basic information, but also, through database association queries, nests the related object user_simple_dto object within the object of id_card_abstract_dto, presenting a complete data structure that includes the associated data.

As another example, in response to the data retrieval instruction, the processing device 110 may retrieve the table data corresponding to the first object instance, id_card_detail_dto, based on the primary key data of the first object instance, id_card_detail_dto, (id=21), and then, the instance of user_detail_dto (id=12) may be data obtained through the foreign key, owner_user_id, and the instance of user_detail_dto (id=12) may in turn recursively retrieve the instance of address_dto (id=2) to get:

```
id_card_detail_dto {
  id: 21
  number: 's1234'
  owner_user: user {//owner_user_id has been converted to the
corresponding object of user_detail_dto
  id: 12
  Name: 'cc'
  birth_address: address {//birth_address_id has been converted to the
corresponding object of address_dto
      id: 2
      province: 'shanghai'
      detail: 'waitan'
    }
  }
}.
```

wherein, the original foreign keys of owner_user_id and birth_address_id in the first object, id_card_detail_dto, are converted to concrete objects, making, based on id_card_abstract_dto, the object, id_card_detail_dto, not only include the identity card information and personnel information, but also retrieve, by querying the birth_address_id of the person, the birth address personnel information. This address information is then encapsulated into an object corresponding to the address table, which includes details such as the address id, province, and specific details about the address.

As another example, on the basis of the first object, user_with_dog_dto, corresponding to the user table that has been constructed in the foregoing example, in obtaining the data of the person corresponding to id=11, the processing device 110 may retrieve the person with id=11 from the user table, and simultaneously obtain the data of the two dogs owned by the person. On completion of the retrieval, an instance of the object, user_with_dog_dto, that expresses the detailed personnel information and the information about the two dogs associated with the person is constructed as:

```
user_with_dog_dto {
  id: 11
  name: 'xz'
```

-continued

```
birth_address_id: 1
dogs: [
dog_dto {
  Id: 31
  color: 'green'
},
dog_dto {
  id: 32
  color: 'red'
}
]
}.
```

With this example, and the preceding example, the processing device 110 performs the following: first, an object, user_with_dog_dto, is defined, which includes basic information about the person and a field of a type of List<dog_dto>, dogs. This field is configured to store information about all dogs owned by the personnel. When a user requests information about a person, a database query is executed to obtain basic information about the person and all dogs owned by the person, and the object, user_with_dog_dto, is returned to the user interface or higher-level application, which includes not only the basic information about the person, but also information about the two dogs owned by the person. In this way, it is possible to return information about the person and all the dogs associated with the person in a single query, which improves query efficiency and simplifies the client-side processing logic.

Figure 4:
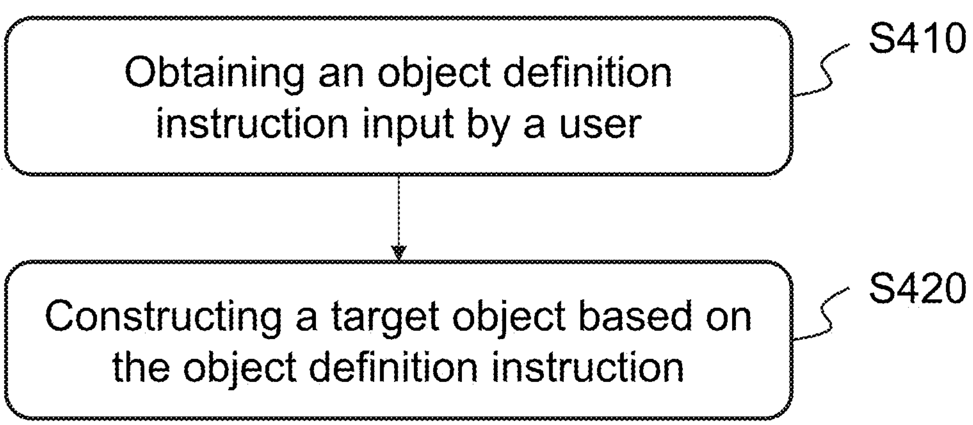
FIG. 4 is a flowchart illustrating an exemplary object definition process based on ER information according to some embodiments of the present disclosure.

FIG. 4 is a flowchart illustrating an exemplary object definition process based on ER information according to some embodiments of the present disclosure. In some embodiments, process 400 may be executed by the system 100 and/or the system 200. For example, the process 300 may be implemented as a set of instructions (e.g., the first instructions) stored in a storage device (e.g., the storage device 120 illustrated in FIG. 1). In some embodiments, the processing device 110 of the system 100 and/or one or more modules of the system 200 may execute the set of instructions and may accordingly be directed to perform the process 400.

In S410, an object definition instruction input by a user is obtained. In some embodiments, S410 is performed by the instruction acquisition module 210.

The processing device 110 obtains an instruction such as an object definition instruction input by a user via a user terminal (e.g., the terminal 130) or the like. More descriptions of how to obtain the object definition instruction may be found in S310 and related descriptions thereof.

In S420, a target object is constructed based on the object definition instruction. In some embodiments, S420 is performed by the ER information acquisition module 220 and the attribute definition operation module 230.

The target object is the first object that includes the information of the second object. The first object is a main object being processed. The information of the second object is an object corresponding to a database table that has a foreign key association with the first object. Both the first object and the second object are data structures corresponding to data tables.

When the object definition instruction is acquired, in response to determining that the foreign key satisfies a preset condition, the processing device 110 processes the attribute type of the first object, and/or adds a new attribute of the first object. The preset condition includes the existence of a first foreign key in the first object that points to the second object or the existence of a second foreign key in the second object that points to the first object.

In response to an object definition instruction, when a first foreign key pointing to a second object exists in the first object, the processing device 110 may add an attribute of the type of the second object to the first object, and/or replace the attribute type of the first foreign key with the type of the second object. The replacing operation includes replacing an attribute type of a first attribute that is a first foreign key in a data structure of the first object with the type of the second object.

In response to an object definition instruction, the processing device 110 may add an attribute of a type of the second object or an attribute of a collection type of the second object to the first object when a second foreign key pointing to the first object exists in the second object. The processing device 110 may add a new attribute in the first object, and the new attribute is of the same type as or associated with the type of the second object or the collection type of the second object.

When the count of second objects that satisfy the foreign key representation is two or more, in response to the selection instruction of the user, the processing device 110 may determine, from the two or more second objects, the second object that is selected by the selection instruction.

More descriptions of how to construct a target object based on the object definition instruction may be found in S320 and related descriptions thereof.

Figure 5:
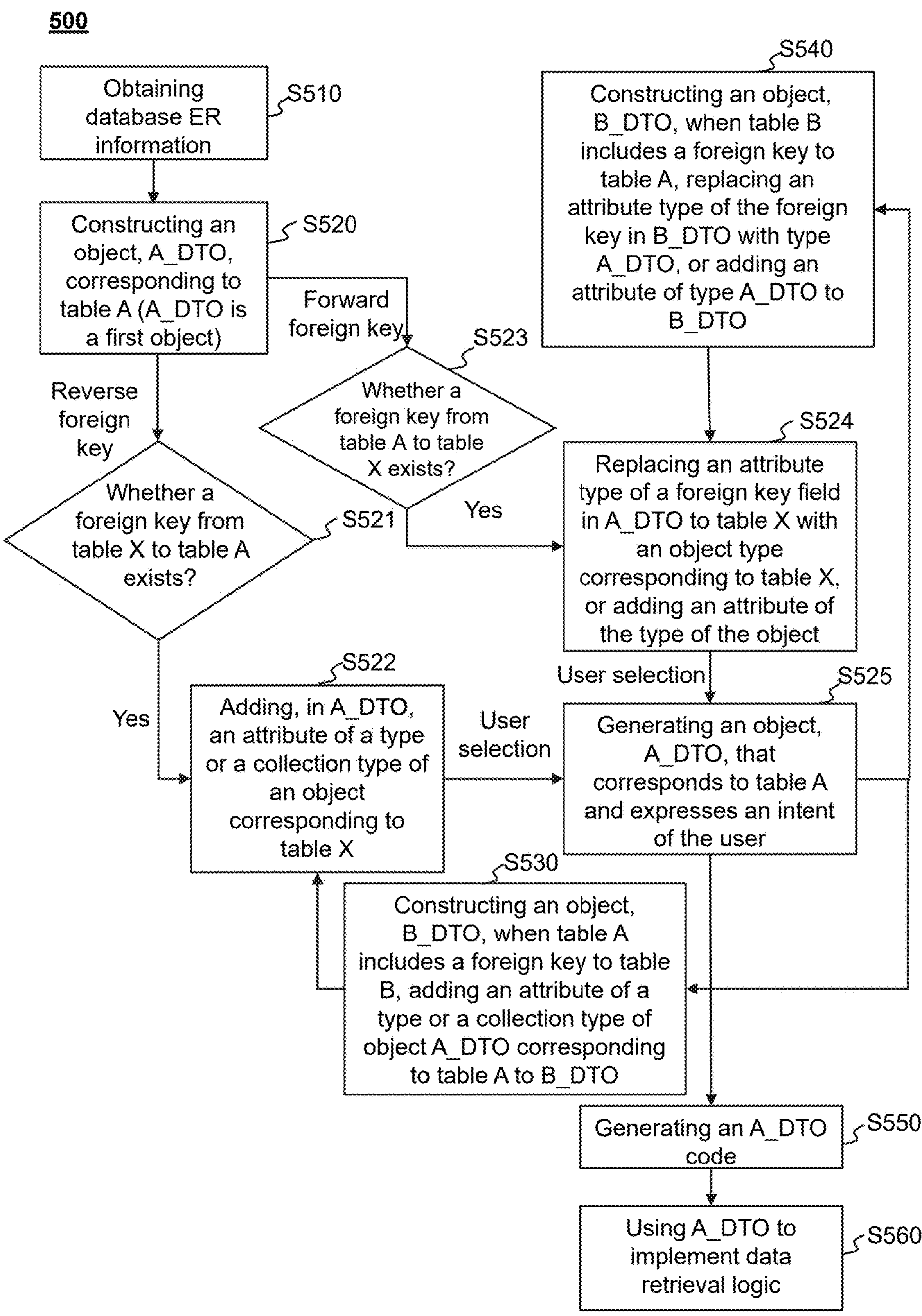
FIG. 5 is a schematic diagram illustrating an exemplary object definition process based on ER information according to some embodiments of the present disclosure.

FIG. 5 is a schematic diagram illustrating an exemplary object definition process based on ER information according to some embodiments of the present disclosure. In some embodiments, at least part of the process 500 may be performed to achieve at least part of operation S320 and/or operation S420 as described in connection with FIG. 3 and FIG. 4. For example, the processing device 110, or the ER information acquisition module 220 and the attribute definition operation module 230 in the system 200 may be performed by performing at least a portion of the process 500 to perform an attribute definition operation of the first object to construct the first object including the information of the second object.

In S510, ER information of a database is obtained. The processing device 110 may obtain database data from a storage device (e.g., the storage device 120), etc., based on the object definition instruction input by the user, and obtain ER information corresponding to the object specified in the object definition instruction (e.g., the first object) from the database data.

In S520, an object, A_DTO, corresponding to table A is constructed, wherein A_DTO is a first object. S520 includes S521-S525.

When the user needs to construct the object, A_DTO, corresponding to table A, there may be two possible cases: the first case is the existence of a forward foreign key (first foreign key representation); and the second case is the existence of a reverse foreign key (second foreign key representation).

In S521, whether a foreign key from table X to table A exists is determined, wherein table X may be any table in the data including table A. To determine if a reverse foreign key exists, whether one or more foreign keys from other tables X to table A exist is determined. If the result is yes, the existence of the reverse foreign key is determined, and the processing device 110 performs S522.

In S522, an attribute of a type or a collection type of an object corresponding to table X is added in A_DTO. The user may cause the processing device 110 to add an attribute to A_DTO by sending an instruction or manually selecting, for example, a type of the added attribute may be the type or a collection type of these objects corresponding to the table X as defined by the user. The processing device then performs S525.

In S523, whether a foreign key from table A to table X exists is determined, wherein table X may be any table in the data including table A. To determine if a forward foreign key exists, whether a foreign key pointing to table X exists in table A is determined. If the result is yes, the existence of the forward foreign key is determined, and the processing device 110 performs S524.

In S524, a type of an attribute of a foreign key field that points to table X in A_DTO is replaced with an object type corresponding to table X, or an attribute of the object type is added. The user may send an instruction or make manual selection to cause the processing device 110 to replace the type of the attribute of the foreign key field that points to table X in A_DTO with the object type corresponding to table X, or add an attribute of the type. Then, the processing device performs S525.

In S525, the processing device generates an object, A_DTO, corresponding to the table A and expressing a reasonable table range of the intent of the user. Based on the user selection (e.g., a new attribute or a replacement attribute), after S522 or S524, the processing device 110 generates an object for data transferring, A_DTO, that corresponds to the table A and accurately expresses the intent of the user. The processing device 110 then performs S550. In some embodiments, after S525, the processing device 110 may perform S530 or S540.

In S530, the processing device constructs an object, B_DTO, wherein when table A includes a foreign key (reverse foreign key) to table B, the processing device 110 may add an attribute of a type or a collection type of object A_DTO corresponding to table A to B_DTO. That is, B_DTO is a new first object, and the type A_DTO is a candidate attribute type in the second object candidate set. In some embodiments, the processing device 110 then may perform S522, the operations from S522 to S530 may be performed iteratively.

In S540, the processing device constructs an object, B_DTO, wherein when table B includes a foreign key (forward foreign key) to table A, the processing device 110 may replace an attribute type of the foreign key in B_DTO with type A_DTO or add an attribute of type A_DTO to B_DTO. That is, B_DTO is a new first object, and the type A_DTO is a candidate attribute type in the second object candidate set. In some embodiments, the processing device 110 then may perform S524, the operations from S524 to S540 may be performed iteratively.

In S550, the processing device generates an A_DTO code. After S525, the processing device 110 may generate a code corresponding to A_DTO, e.g., a code corresponding to operations of data acquisition, editing, saving, etc., in A_DTO, or a code corresponding to a data retrieval operation. Then, the processing device 110 performs S560.

In S560, a corresponding data retrieval logic is implemented using A_DTO. The processing device 110 may perform a data retrieval operation based on the code corresponding to the data retrieval operation in the code of the A_DTO, or, in response to the data retrieval instruction, the processing device 110 may use the A_DTO as the target object of the data retrieval operation to obtain the A_DTO corresponding data.

The operations of the illustrated processes 300, 400, and 500 presented above are intended to be illustrative. In some embodiments, a process may be accomplished with one or more additional operations not described, and/or without one or more of the operations discussed. Additionally, the order in which the operations of a process described above is not intended to be limiting.

Figure 6:
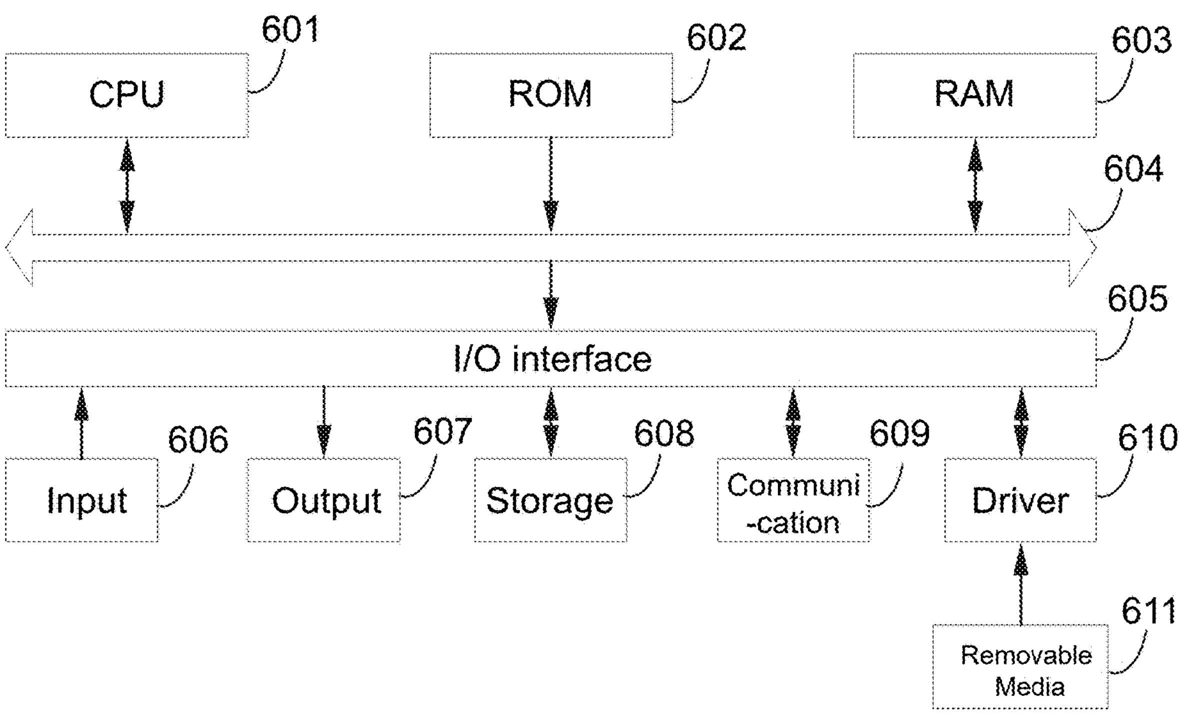
FIG. 6 is a schematic diagram of illustrating exemplary processing device according to some embodiments of the present disclosure.

FIG. 6 is a schematic diagram of illustrating exemplary processing device according to some embodiments of the present disclosure. In some embodiments, the processing device 110 may be implemented by a computer system 600.

As shown in FIG. 6, the computer system 600 includes a central processing unit (CPU) 601, a read-only memory (ROM) 602, a random-access memory (RAM) 603, a bus 604, an I/O interface 605, an input portion 606, an output portion 607, a storage portion 608, a communication portion 609, a driver 610, and a removable medium 611.

The CPU 601 executes various appropriate actions and processes based on programs stored in a read-only memory (ROM) 602 or programs loaded from a storage section 608 into a random access memory (RAM) 603. In RAM 603, various programs and data necessary for operating the instructions are also stored. The CPU 601, the ROM 602, and the RAM 603 are connected to each other via the bus 604. The I/O interface 605 is also connected to the bus 604.

Some of the components in the computer system 600 are connected to the I/O interfaces 605, i.e., an input portion 606 including a keyboard, a mouse, or the like; an output portion 607 including such things as a cathode ray tube (CRT), a liquid crystal display (LCD), speakers, or the like; the storage portion 608 including hard disks, or the like; and a communication portion 609 including a network interface card such as a LAN card, a modem, or the like. The communication portion 609 performs communication processing via a network such as the Internet. The drive 610 is connected to the I/O interface 605 as needed. The removable medium 611 is mounted to the drive 610 as needed to allow computer programs read from it to be installed into the storage portion 608 as needed. The removable medium 611 includes one of a disk, an optical disk, a magnetic disk, a semiconductor memory, or the like, or any combination thereof.

Processes described by processes 300, 400, and 500 may be implemented as computer software programs and executed by CPU 601 to implement the operations in the ER information-based object definition method shown in some embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a count of patentable classes or context including any new and useful process, machine, manufacture, or composition of matter, or any new and useful improvement thereof. Accordingly, aspects of the present disclosure may be implemented entirely hardware, entirely software (including firmware, resident software, micro-source code, etc.) or combining software and hardware implementation that may all generally be referred to herein as a "unit," "module," or "system." Furthermore, aspects of the present disclosure may take the form of a computer program product embodied in one or more computer readable media having computer readable program source code embodied thereon.

A computer readable signal medium may include a propagated data signal with computer readable program source code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program source code embodied on a computer readable signal medium may be transmitted using any appropriate medium, including wireless, wireline, optical fiber cable, RF, or the like, or any suitable combination of the foregoing.

Computer program source code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program source code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties configured to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present disclosure are not limited to that precisely as shown and described.

What is claimed is:

1. A method for object definition based on entity-relationship (ER) information, implemented on a computing device including at least one processor and at least one storage device, the method comprising:

in response to an object definition instruction input by a user, obtaining the ER information, wherein the ER information represents a relationship between a first object and a second object through a foreign key, and each of the first object and the second object is a data structure corresponding to a data table;

constructing the first object including information of the second object by performing an attribute definition operation on the first object, wherein the attribute definition operation includes: in response to determining that the foreign key satisfies a first preset condition, processing an attribute type of the first object, or adding a new attribute of the first object, including:

in response to determining that the first object includes a first foreign key pointing to the second object, adding an attribute of a type of the second object to the first object, or replacing an attribute type of the first foreign key with the type of the second object; or in response to determining that the second object includes a second foreign key pointing to the first object, adding, to the first object, an attribute of a type of the second object or an attribute of a collection type of the second object;

the adding, to the first object, an attribute of a type of the second object or an attribute of a collection type of the second object includes: adding a new attribute to the first object, a type of the new attribute being the same as or associated with the type or the collection type of the second object; and the replacing an attribute type of the first foreign key with the type of the second object includes: replacing an attribute type of a first attribute used as the first foreign key in the data structure of the first object with the type of the second object; and when a count of second objects represented by the foreign key is two or more, the constructing the first object including information of the second object by performing an attribute definition operation on the first object further includes:

in response to a selection instruction of the user, determining a second object selected by the selection instruction from the two or more second objects;

determining a complexity degree of the object definition instruction based on a count of attribute types in the first object and an average correlation of the attribute types;

in response to determining that the complexity degree satisfies a second preset condition, generating a plurality of candidate data retrieval parameters, each of the plurality of candidate data retrieval parameters including a query count and a query content;

for each candidate data retrieval parameter estimating total query time of the candidate data retrieval parameter;

determining a candidate data retrieval parameter with the least total query time as a target data retrieval parameter; and generating a source code based on the target data retrieval parameter, the source code being configured to retrieve data from a database;

wherein determining the average correlation of the attribute types includes:

for each of the attribute types in the first object, determining a table count of other data tables associated with a data table corresponding to the attribute type;

determining a sum of the table counts for the attribute types in the first object; and determining the average correlation by dividing the sum by the count of the attribute types in the first object.

2. The method of claim 1, wherein the object definition instruction is input by a non-coding manner, the non-coding manner including at least one of user interface selection, writing description files, optical character recognition (OCR), image recognition, voice input, and natural language input.

3. The method of claim 1, further comprising:

in response to a data retrieval instruction, obtaining table data corresponding to a primary key of the first object; and obtaining corresponding data of the second object based on a foreign key representation between the first object and the second object; and combining the table data and the corresponding data into an instance of the first object.

4. The method of claim 1, wherein after constructing the first object including the information of the second object, the method further includes:

in response to a source code generation instruction, generating a source code corresponding to the first object.

5. The method of claim 1, wherein after constructing the first object including the information of the second object, the method further includes:

generating a source code corresponding to the first object; and obtaining data corresponding to the object definition instruction by performing, through executing the source code, data retrieval from a database.

6. The method of claim 5, further comprising:

combining the data corresponding to the object definition instruction into an instance of the first object; and displaying the instance of the first object to the user, the instance of the first object being a specific implementation of the first object and including data queried from the database.

7. The method of claim 1, wherein the estimating total query time of the candidate data retrieval parameter includes:

estimating the total query time of the candidate data retrieval parameter using a machine learning model based on the candidate data retrieval parameter, the complexity degree of the object definition instruction, a computing power of the database, a data amount of the database, and a correlation complexity degree of the database.

8. A system for object definition based on entity-relationship (ER) information, comprising:

at least one storage device including a set of first instructions; and at least one processor in communication with the at least one storage device, wherein when executing the set of the first instructions, the at least one processor causes the system to perform operations including:

in response to an object definition instruction input by a user, obtaining the ER information, wherein the ER information represents an association relationship between a first object and a second object through foreign key representation, and the first object and the second object are both data structures corresponding to data tables;

constructing the first object including information of the second object by performing an attribute definition operation on the first object, wherein the attribute definition operation includes: in response to determining that the foreign key satisfies a first preset condition, processing an attribute type of the first object, or adding a new attribute of the first object, including:

in response to determining that the first object includes a first foreign key pointing to the second object, adding an attribute of a type of the second object to the first object, or replacing an attribute type of the first foreign key with the type of the second object; or in response to determining that the second object includes a second foreign key pointing to the first object, adding, to the first object, an attribute of a type of the second object or an attribute of a collection type of the second object;

the adding, to the first object, an attribute of a type of the second object or an attribute of a collection type of the second object includes: adding a new attribute to the first object, a type of the new attribute being the same as or associated with the type or the collection type of the second object; and the replacing an attribute type of the first foreign key with the type of the second object includes: replacing an attribute type of a first attribute used as the first foreign key in the data structure of the first object with the type of the second object; and when a count of second objects represented by the foreign key is two or more, the constructing the first object including information of the second object by performing an attribute definition operation on the first object further includes:

in response to a selection instruction of the user, determining a second object selected by the selection instruction from the two or more second objects;

determining a complexity degree of the object definition instruction based on a count of attribute types in the first object and an average correlation of the attribute types;

in response to determining that the complexity degree satisfies a second preset condition, generating a plurality of candidate data retrieval parameters, each of the plurality of candidate data retrieval parameters including a query count and a query content;

for each candidate data retrieval parameter, estimating total query time of the candidate data retrieval parameter;

determining a candidate data retrieval parameter with the least total query time as a target data retrieval parameter; and generating a source code based on the target data retrieval parameter, the source code being configured to retrieve data from a database;

wherein determining the average correlation of the attribute types includes:

for each of the attribute types in the first object, determining a table count of other data tables associated with a data table corresponding to the attribute type;

determining a sum of the table counts for the attribute types in the first object; and determining the average correlation by dividing the sum by the count of the attribute types in the first object.

9. The system of claim 8, wherein the object definition instruction is input by a non-coding manner, the non-coding manner including at least one of user interface selection, writing description files, optical character recognition (OCR), image recognition, voice input, and natural language input.

10. The system of claim 8, wherein the operations further include:

in response to a data retrieval instruction, obtaining table data corresponding to a primary key of the first object, and obtaining corresponding data of the second object based on a foreign key representation between the first object and the second object; and combining the table data and the corresponding data into a first object instance.

11. The system of claim 8, wherein after the constructing the first object containing the information of the second object, the operations further include:

in response to a source code generation instruction, generating a source code corresponding to the first object.

12. The system of claim 8, wherein after the constructing the first object containing the information of the second object, the operations further include:

generating a source code corresponding to the first object; and performing data retrieval from a database by executing the source code to obtain data corresponding to the object definition instruction.

13. The system of claim 12, wherein the operations further include:

combining the data corresponding to the object definition instruction into a first object instance and displaying the first object instance to the user, the first object instance being a specific implementation of the first object and containing data queried from the database.

14. The system of claim 8, wherein the determining total query time for the candidate data retrieval parameter includes:

based on the candidate data retrieval parameters, the complexity degree of the object definition instruction, a computing power of the database, an data amount of the database, and an correlation complexity degree of the database, determining the total query time of the candidate data retrieval parameter by a machine learning model.

15. A non-transitory computer readable medium, comprising executable instructions that, when executed by at least one processor, direct the at least one processor to perform a method, the method comprising:

in response to an object definition instruction input by a user, obtaining the ER information, wherein the ER information represents a relationship between a first object and a second object through a foreign key, and each of the first object and the second object is a data structure corresponding to a data table;

constructing the first object including information of the second object by performing an attribute definition operation on the first object, wherein the attribute definition operation includes: in response to determining that the foreign key satisfies a first preset condition, processing an attribute type of the first object, or adding a new attribute of the first object, including:

in response to determining that the first object includes a first foreign key pointing to the second object, adding an attribute of a type of the second object to the first object, or replacing an attribute type of the first foreign key with the type of the second object; or in response to determining that the second object includes a second foreign key pointing to the first object, adding, to the first object, an attribute of a type of the second object or an attribute of a collection type of the second object;

the adding, to the first object, an attribute of a type of the second object or an attribute of a collection type of the second object includes: adding a new attribute to the first object, a type of the new attribute being the same as or associated with the type or the collection type of the second object; and the replacing an attribute type of the first foreign key with the type of the second object includes: replacing an attribute type of a first attribute used as the first foreign key in the data structure of the first object with the type of the second object; and when a count of second objects represented by the foreign key is two or more, the constructing the first object including information of the second object by performing an attribute definition operation on the first object further includes:

in response to a selection instruction of the user, determining a second object selected by the selection instruction from the two or more second objects;

determining a complexity degree of the object definition instruction based on a count of attribute types in the first object and an average correlation of the attribute types;

in response to determining that the complexity degree satisfies a second preset condition, generating a plurality of candidate data retrieval parameters, each of the plurality of candidate data retrieval parameters including a query count and a query content;

for each candidate data retrieval parameter, estimating total query time of the candidate data retrieval parameter;

determining a candidate data retrieval parameter with the least total query time as a target data retrieval parameter; and generating a source code based on the target data retrieval parameter, the source code being configured to retrieve data from a database;

wherein determining the average correlation of the attribute types includes:

for each of the attribute types in the first object, determining a table count of other data tables associated with a data table corresponding to the attribute type;

determining a sum of the table counts for the attribute types in the first object; and determining the average correlation by dividing the sum by the count of the attribute types in the first object.

16. The non-transitory computer readable medium of claim 15, wherein the object definition instruction is input by a non-coding manner, the non-coding manner including at least one of user interface selection, writing description files, optical character recognition (OCR), image recognition, voice input, and natural language input.

17. The non-transitory computer readable medium of claim 15, wherein the method further includes:

in response to a data retrieval instruction, obtaining table data corresponding to a primary key of the first object, and obtaining corresponding data of the second object based on a foreign key representation between the first object and the second object; and combining the table data and the corresponding data into a first object instance.

18. The non-transitory computer readable medium of claim 15, wherein after the constructing the first object containing the information of the second object, the method further includes:

in response to a source code generation instruction, generating a source code corresponding to the first object.

* * * * *